United States Patent [19]

Kiovsky et al.

[11] 3,979,367
[45] Sept. 7, 1976

[54] POLYKETONE DERIVATIVE
[75] Inventors: Thomas E. Kiovsky; Richard C. Kromer, both of Houston, Tex.
[73] Assignee: Shell Oil Company, Houston, Tex.
[22] Filed: June 13, 1975
[21] Appl. No.: 587,199

[52] U.S. Cl. .................... 260/79.5 C; 260/63 CQ; 260/79.5 NV
[51] Int. Cl.² ................. C08F 28/00; C08G 2/00; C08G 4/00
[58] Field of Search.... 260/63 CQ, 79.5C, 79.5 NV, 260/94.96 D

[56] References Cited
UNITED STATES PATENTS

| | | | |
|---|---|---|---|
| 2,411,954 | 12/1946 | Burke | 260/79.5 NV |
| 2,495,286 | 1/1950 | Brubaker | 260/63 CQ |
| 2,495,293 | 1/1950 | Scott | 260/63 CQ |
| 2,634,254 | 4/1953 | Lipscomb | 260/63 CQ |
| 2,680,763 | 6/1954 | Brubaker | 260/63 CQ |
| 3,662,023 | 5/1972 | Kehr et al. | 260/79.5 C |
| 3,689,460 | 9/1972 | Nozaki | 260/63 CQ |
| 3,725,508 | 4/1973 | Stamm | 260/79.5 NV |
| 3,835,123 | 9/1974 | Nozaki | 260/63 CQ |

Primary Examiner—Joseph L. Schofer
Assistant Examiner—Herbert J. Lilling

[57] ABSTRACT

A thermoplastic polymer composition and the method for making the same are disclosed. The polymer composition comprises randomly distributed units of

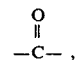

$-CH_2-CH_2-$ and

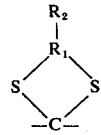

or

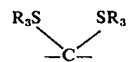

in specified ratios. The process for producing the polymer comprises reacting a polyketone and a monothiol or dithiol compound in specified amounts.

7 Claims, No Drawings

POLYKETONE DERIVATIVE

THE PRIOR ART

Interpolymers of carbon monoxide and ethylene (polyketones), as well as processes for their preparation are well known. The first polyketones were disclosed by Farbenfabriken Bayer in 1941, German Pat. No. 863,771. Significant classes of polyketones which have been prepared include: (1) high molecular weight copolymers which are essentially polyethylene with less than 1% CO incorporated, prepared via Ziegler catalysis (British Pat. No. 925,130); (2) free radical and radiation initiated copolymers which have low molecular weight and a CO content varying up to 50% (W. G. Barb, Journal of the American Chemical Society, 75, 224 (1953), P. P. Colombo et at, Journal of Polymer Science B1, 447 (1963)); and (3) transition metal catalyzed copolymers with an apparent regular alternating-chain structure. Processes to prepare these alternating-chain structure polyketones are disclosed in U.S. Pat. No. 2,577,208 [$K_2Ni(CN)_4$ catalyst], British Pat. No. 1,081,304 [$(Bu_3P)_2Pd(Cl)_2$ catalyst], and U.S. Pat. No. 3,835,123, [$HPd(CN)_3$ catalyst].

High molecular weight polyketones are particularly desirable polymers because of the low cost of the reactants (carbon monoxide and ethylene) employed and because of their potential use as premium thermoplastics. However, some of the present high molecular weight polyketones cannot be processed by the usual extrusion methods without destroying some of the thermoplastic properties. In particular, when an equimolar alternating copolymer of ethylene and carbon monoxide having a molecular weight of about 300,000 daltons and a melting point of about 250°C prepared by using a quaternary ammonium tetracyanonickelate catalyst and a hexafluoroisopropanol solvent is pressed to a film at or above its melting point, decomposition, characterized by loss of water and discoloration, occurs. These same polyketones undergo significant cross-linking and heated for as little as four minutes at temperatures of 20 to 30°C below their melting point.

One means to improve the processability of the high molecular weight polyketone is to derivitize the polyketone. Two derivatives of a polyketone having improved processability are disclosed in our copending patent applications, Polymeric Pyrrollic Derivatives, Ser. No. 587,001 filed 6-13-75 (Attorney's Docket Number K-4154); and Polymeric Derivative, Ser. No. 587,198, Filed 6-13-75 (Attorney's Docket Number K-4155). A new derivative of a polyketone, suitable as a thermoplastic, has now been found that not only is significantly crosslinked at extrusion temperatures, but also possesses some elastomeric properties not found in the unmodified polyketone.

SUMMARY OF THE INVENTION

The present invention discloses a thermoplastic polymer composition and the method for making the same, which composition comprises randomly distributed units of

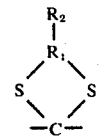

—$CH_2$—$CH_2$—, and

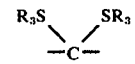

or

in specified ratios.

DETAILED DESCRIPTION OF THE INVENTION

The Polymer Composition

The thermoplastic polymer disclosed is characterized by random distribution along the polymer chain of x units of

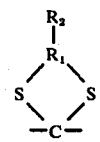

y units of $CH_2$—$CH_2$— and z units of

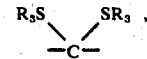

or

where a. $R_1$ is an alkyl group of from 1 to 4 carbon atoms, $R_2$ is selected from the group consisting of hydrogen and alkyl, aryl and alkenyl groups of from 1 to 20 carbon atoms, and $R_3$ is selected from the group consisting of alkyl, aryl and alkenyl groups of from 1 to 20 carbon atoms;

b. $x$, $y$ and $z$ are integers;

c. $y$ has a value of from about 150 to 10,000;

d. the ratio of $x$ to $y$ varies from 10:100 to about 100:100; and e. the ratio of $z$ to $x$ varies from about 2:100 to about 25:100.

Preferably, the polymer is characterized by random distribution along the polymer chain of $x$ units of

$y$ units of —$CH_2$—$CH_2$—, and $z$ units of

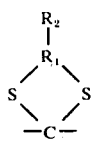

The total molecular weight of the polymer typically varies from about 30,000 to bout 300,000 daltons. Preferably $y$ has a value of from 600 to about 8000, most preferably from about 800 to about 2500. Preferably the ratio of $x$ to $y$ varies from about 25:100 to about 100:100, most preferably from about 50:100 to about 100:100.

The polymeric thioketal derivative disclosed retains most of the favorable characteristics of the unmodified polyketone and in addition has a lower melting point than the unmodified polyketone thereby permitting the extrusion forming of thermoplastic products without significant crosslinking and decomposition. One means to control the melting point and other properties of the polymer is to vary the ratio of $z$ to $x$. The ratio of $z$ to $x$ preferably aries from about 3:100 to about 20:100 and most preferably from about 5:100 to about 15:100.

Selection of the substituents $R_1$, $R_2$ and $R_3$ in the polymer composition also has a significant effect on the properties of the polymer. Preferably $R_1$ is an ethylene group. Preferably $R_2$ is either hydrogen or an alkyl group of from 1 to 20 carbon atoms. More preferably, $R_2$ is selected frm the group consisting of hydrogen, methyl, ethyl and propyl groups. Moreover, when $R_2$ is an alkyl group of from about 4 to about 10 carbon atoms, e.g. a n-hexyl group, the polymer has elastomeric properties comparable to plasticized poly(vinylchloride). In addition, polymers of this latter group wherein $R_2$ is an alkyl groups of from 4 to 10 carbon atoms, resist swelling or dissolution in common solvents such as as naphtha, gasoline, and motor oil, whereas some common block copolymers, such as a styrene-butadiene-sytrene terpolymer, are sensitive to such hydrocarbon solvents.

Likewise $R_3$ is preferably an alkyl group of from 1 to 20 carbon atoms. More preferably $R_3$ is an alkyl group of from 1 to 4 carbon atoms, e.g. a methyl, ethyl, propyl or butyl group. Moreover when $R_3$ is an alkyl group of from about 6 to about 10 carbon atoms, e.g. a n-heptyl group, the polymer also has elastomeric properties comparable to plasticized poly(vinylchloride).

As disclosed the polymer composition has thio groups, signified by

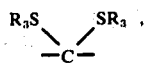

or cyclic-thio groups, signified by

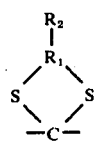

Preferably, the polymer composition has cyclic-thio groups because these structures are usually more stable and easier to synthesize.

Process for Making the Polymer

Also of importance is the process for making the polymer. The cyclic thioketal derivative is prepared by reacting a polyketone with $w$ moles of a dithiol in the presence of a catalyst wherein:

a. said polyketone is characterized by random distribution along the polymer chain of $u$ units of

and $v$ units of $-CH_2-CH_2-$, where $u$ and $v$ are both integers, $v$ has a value of from about 150 to about 10,000, and the ratio of $u$ to $v$ varies from about 25:100 to about 100:100;

b. said dithiol has the formula

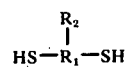

where $R_1$ is an alkyl group of from 1 to 4 carbon atoms and $R_2$ is selected from the group consisting of hydrogen and alkyl, aryl, and alkenyl groups of from 1 to 20 carbon atoms; and c. the ratio of $w$ to $u$ varies from about 1:51 to about 1:5.

The non-cyclic thioketal is prepared in a similar manner as the cyclic thioketal except that two units of a monothiol are employed instead of one unit of a dithiol. Specifically the non-cyclic thioketal derivative is prepared by reacting a polyketone with $h$ moles of a monothiol in the presence of a catalyst wherein:

a. said polyketone is characterized by random distribution along chain of $f$ units of

and $g$ units of $-CH_2-CH_2-$, where $f$ and $g$ are both integers, $g$ has a value of from about 150 to about 10,000, and the ratio of $f$ to $g$ varies from about 25:100 to about 100:100;

b. said monothiol has the formula $R_3SH$ where $R_3$ is selected from the group consisting of alkyl, aryl, and alkenyl groups of from 1 to 20 carbon atoms; and c. the ratio of $h$ to $f$ varies from about 2:51 to about 2:5.

The polyketone employed is prepared by any suitable catalyst system. Useful catalyst systems are those disclosed in the Prior Art portion of the specification. Preferably both $v$ and $g$ have values of from about 600 to about 8,000, most preferably from about 800 to about 2500. The ratios of $u$ to $v$ and $f$ to $g$ preferably have values of from about 25:100 to about 100:100. In a preferred embodiment, the polyketone is an equimolar alternating copolymer of ethylene and carbon monoxide. Accordingly, it is most preferred that the ratio of $u$ to $v$ and $f$ to $g$ equal 1:1. Equimolar alternating copolymers are produced by the catalyst systems disclosed in U.S. Pat. No. 3,835,123 [HPd(CN)$_3$ catalyst] and in a copending application by Holler et al entitled Process for Preparing Polyketones, Ser. No. 582,949, Filed June 2, 1975, (Attorney's Docket No. K-4125).

The monothiol employed has the formula R₃SH and is preferably an alkyl thiol having from about 1 to about 10 carbon atoms. More preferably R₃ is an alkyl group of from 1 to 4 carbon atoms, e.g. a methyl, ethyl, propyl or butyl group. Moreover, when R₃ is an alkyl group of from about 6 to about 10 arbon atoms, e.g. a n-heptyl group, the polymer also has elastomeric properties as discussed above.

When it is desired to prepare the cyclic thioketal derivative, a dithiol is employed. The dithiol employed has the formula

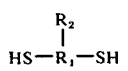

Preferably, R₁ is an ethylene group and R₂ is either hydrogen or an alkyl group of from 1 to 20 carbon atoms. More preferably, R₂ is selected from the group consisting of hydrogen, methyl, ethyl and propyl groups. Moreover, when R₂ is an alkyl group of from about 4 to about 10 carbon atoms, e.g. a n-hexyl group, the polymer also has elastomeric properties as discussed above.

By varying the ratio of mono- or di-thiol compound to polyketone (i.e. the ratio of f to h and w to u), the melting point and other properties of the polymer are changed. Preferably the ratio of w to u varies from about 3:103 to about 1:6, and most preferably from about 1:21 to about 3:23. Preferably the ratio of f to h varies from about 6:103 to about 1:3, and most preferably from about 2:21 to about 6:23. In some instances all the mono- or di-thiol does not react with the polyketone. Accordingly, in those situations it is necessary to employ an excess of mono- or di-thiol compound.

The mono- or di-thiol compound and the polyketone are preferably contacted in the presence of a catalyst and a solvent. Useful catalysts include p-toluenesulfonic acid, chloroacetic acid, sulfuric acid, trifluoromethane-sulfonic acid and other strong acids. A preferred catalyst is trifluoroacetic acid. The amount of catalyst employed varies from about 0.1% weight to about 2.0% weight based on the combined weight of the polyketone and the thiol compound. A preferred catalyst concentration is between about 0.3% weight and about 1.0% weight. The solvents employed are meta-cresol and hexafluoroisopropanol. A preferred solvent is hexafluoroisopropanol. The amount of solvent employed is not critical. Preferred amounts vary from about 99% to about 50% weight of the resulting solution. Optionally, a compound such as magnesium sulfate or 2,2-dimethoxypropane is added to the reaction mixture to absorb the water generated in the condensation reaction, thereby improving the reaction equilibrium. The typical amount of absorbent, when added, varies from about 1% weight to about 5% weight based on the combined weight of the polyketone and the thiol compound.

The polyketone and thiol are contacted in any suitable manner In one embodiment the polyketone is first dissolved in the solvent. Then the thiol compound, catalyst, and optional absorbent are added to the mixture. The resulting mixture is then heated. Reaction temperatures vary from about 40°C to about 100°C, preferably from about 50°C to about 70°C. Reaction pressure may be atmospheric, sub-atmospheric or super-atmospheric. Contact times vary from about 10 minutes to about 4 hours. The polymer is separated from the reaction mixture by various procedures such as fractional distillation and a precipitation technique. In one procedure water is added to the reaction mixture thereby precipitating the polymer. The polymer is then removed, e.g. by a centrifuge, filered and dried.

The polymers prepared according to this invention are useful as thermoplastic materials. Typically, the polymer is extruded to form materials for use as automobile trim molding or for other decorative uses. Further, other materials are typically added to the polymer such as plasticizers, extenders and fillers. These other materials include, for example, glycerol, 1,4-butanediol, glass fiber and carbon black.

The invention is further illustrated by means of the following Illustrative Embodiment and Comparative Example. Note that the embodiment and example are given for the purpose of illustration only and that the invention is not to be regarded as limited to any of the specific conditions or reactants recited therein.

In all embodiments and examples, the polyketone employed was an equimolar alternating copolymer of ethylene and carbon monoxide of the general formula

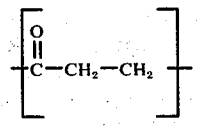

where $t$ is an integer having a value of about 5,000 commensurate with a total molecular weight of about 300,000 daltons. The polyketone was prepared with a quarternary ammonium tetracyanonickelate catalyst and a hexafluoroisopropanol (HFIP) solvent. Most of the catalyst was removed from the resulting polyketone leaving a nickel content for the polyketone of about 8 ppmw. The melting point of the polyketone was about 250°C and the swelling ratio was about 70. The "swelling ratio" is a measure of the crosslinking of a pressed film of the thermoplastic polymer examined. Swelling ratio is determined by cutting a disc from the pressed plastic film after heating at 215°C for 15 minutes and measuring the increase in weight after soaking the film in HFIP for 24 hours at ambient temperature. Swelling ratio is thus the weight of the swollen sample divided by the weight of the original disc. The higher the swelling ratio the less extensive is the crosslinking.

ILLUSTRATIVE EMBODIMENT I

Illustrative Embodiment I details the procedure involved in preparing the polymer composition according to the present invention. To a solution of 2.8 grams (g) polyketone (0.05 moles of repeating units

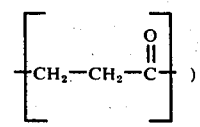

in 50 mililiters (ml) hexafluoroisopropanol (HFIP) was added 0.1 g trifluoroacetic acid and 2.0 g (0.021 mole) 1,2-ethanedithiol. The resulting solution was stirred at reflux (about 60°C) for 1 hour then cooled. The cooled solution was poured into a vessel containing water, resulting in the precipitation of the polymer. The polymer was removed, then contacted with methanol to remove any traces of the dithiol. Subsequently, 3.5 g of polymer having a sulfur content of 14.5% w sulfur and a melting point of 183°C was removed. A $^{13}$C-NMR spectrum of the polymer revealed the presence of

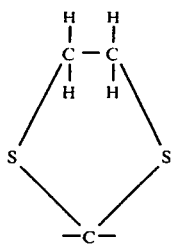

groups. By calculation it was determined that about 13% of the carbonyl groups had been reacted. The results of this embodiment is shown as Run Number 7 in Table I.

In a procedure similar to that employed in Run Number 7, other thioketal derivatives were prepared. The only major differences in the procedure were in the type of reagent employed and the amount of the reagent. The results are presented as Run Numbers 1 through 11 in Table I. In Run Number 11 the polymer obtained had an amorphous structure and also exhibited some elastomeric properties.

TABLE I

| Run No. | Reagent | % Sulfur | % Carbonyl Group Reacted | Ratio of Thioketal Groups to Carbonyl Groups | Melting Point °C |
|---|---|---|---|---|---|
| 1 | Ethanethiol | 1.1 | 1 | 1:100 | 242 |
| 2 | ↓ | 11.9 | 11 | 12:100 | 185 |
| 3 | 1,2-ethanedithiol | 2.8 | 2 | 2:100 | 235 |
| 4 | | 4.6 | 4 | 4:100 | 226 |
| 5 | | 5.0 | 4 | 4:100 | 230 |
| 6 | | 7.4 | 7 | 8:100 | 212 |
| 7 | | 14.5 | 13 | 15:100 | 183 |
| 8 | ↓ | 17.0 | 16 | 19:100 | 170 |
| 9 | 1,2-propanedithiol | 13.5 | 13 | 15:100 | 177 |
| 10 | 1,3-propanedithiol | 11.4 | 11 | 12:100 | 175 |
| 11 | 1,2-octanedithiol | 14.6 | 13 | 15:100 | amorphous |

COMPARATIVE EXAMPLE I

In Comparative Example I phosphorus pentasulfide was employed as the reagent in place of a mono- or di-thiol compound. To a solution of 2.8 g polyketone in 50 ml meta-cresol was added 1.1 g. diphosphorous pentasulfide. The solution was stirred at reflux (about 60°C) for 1 hour, then cooled and agitated in a mixer with 400 ml water to precipitate the polymer. After filtering and drying, a polymer with a melting point of 194°C and containing 2.2% w sulfur was obtained. The sample was rather susceptible to crosslinking, having a swelling ratio of only 15 as compared to a swelling ratio of 70 for the unmodified polyketone.

A $^{13}$C-NMR spectrum of the polymer prepared in Comparative Example I revealed that about 13 percent of the carbonyl groups had reacted and that both furan

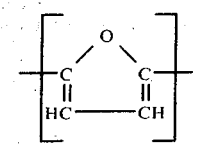

and thiophene

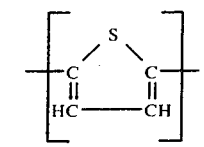

groups were present, with a ratio of furan to thiophene groups of about 3:1.

We claim as our invention:

1. The thermoplastic polymer characterized by random distribution along the polymer chain of $x$ units of $$-\overset{O}{\underset{\|}{C}}-,$$

$y$ units of —CH$_2$—CH$_2$— and $z$ units of

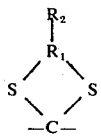

or

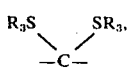

where
a. R$_1$ is an alkyl group of from 1 to 4 carbon atoms, R$_2$ is selected from the group consisting of hydrogen and alkyl, aryl and alkenyl groups of from 1 to 20 carbon atoms, and R$_3$ is selected from the group consisting of alkyl, aryl and alkenyl groups of from 1 to 20 carbon atoms;
b. $x$, $y$ and $z$ are integers;

c. $y$ has a value of from about 150 to about 10,000;
d. the ratio of $x$ to $y$ varies from about 25:100 to about 100:100; and
e. the ratio of $z$ to $x$ varies from about 2:100 to about 25:100.

2. The composition as in claim 1 wherein the thermoplastic polymer is characterized by random distribution along the polymer chain of $x$ units of

$y$ units of —CH$_2$—CH$_2$—, and $z$ units of

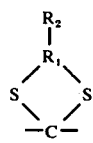

3. The composition as in claim 2 wherein $R_1$ is an ethylene group and $R_2$ is selected from the group consisting of hydrogen, methyl, ethyl and propyl groups.

4. The composition as in claim 2 wherein $R_1$ is an ethylene group and $R_2$ is an alkyl group of from 4 to 10 carbon atoms.

5. The composition as in claim 1 wherein the thermoplastic polymer is characterized by random distribution along the polymer chain of $x$ units of

$y$ units of —CH$_2$—CH$_2$—, and $z$ units of

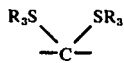

wherein $R_3$ is an alkyl group of from 1 to 20 carbon atoms.

6. The process for making a thermoplastic polymer which comprises reacting a polyketone with w moles of a dithiol in the presence of a strong acid catalyst wherein:
  a. said polyketone is characterized by random distribution along the polymer chain of $u$ units of

and $v$ units of —CH$_2$—CH$_2$—,
    where $u$ and $v$ are both integers, $v$ has a value of from about 150 to about 10,000, and the ratio of $u$ to $v$ varies from about 25:100 to about 100:100;
  b. said dithiol has the formula

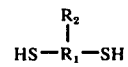

wherein $R_1$ is an alkyl group of from 1 to 4 carbon atoms and $R_2$ is selected from the group consisting of hydrogen and alkyl, aryl and alkenyl groups of from 1 to 20 carbon atoms; and
  c. the ratio of $w$ to $u$ varies from about 1:51 to about 1:5.

7. The process for making a thermoplastic polymer which comprises reacting a polyketone with h moles of a monothiol in the presence of a strong acid catalyst wherein:
  a. said polyketone is characterized by random distribution along the polymer chain of $f$ units of

and $g$ units of —CH$_2$—CH$_2$—, where $f$ and $g$ are both integers, $g$ has a value of from about 150 to about 10,000, and the ratio of $f$ to $g$ varies from about 25:100 to about 100:100;
  b. said monothiol has the formula $R_3$SH where $R_3$ is selected from the group consisting of alkyl, aryl and alkenyl groups of from 1 to 20 carbon atoms; and
  c. the ratio of $h$ to $f$ varies from about 2:51 to about 2:5.

* * * * *